US006963848B1

(12) United States Patent
Brinkerhoff

(10) Patent No.: US 6,963,848 B1
(45) Date of Patent: Nov. 8, 2005

(54) METHODS AND SYSTEM OF OBTAINING CONSUMER REVIEWS

(75) Inventor: Richard Brinkerhoff, Burien, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/517,043

(22) Filed: Mar. 2, 2000

(51) Int. Cl.[7] ............................................. G06F 17/60
(52) U.S. Cl. ............................... 705/10; 705/8; 705/14
(58) Field of Search ............................. 705/10, 14, 26, 705/27, 1, 7, 8

(56) References Cited

U.S. PATENT DOCUMENTS

| | | | |
|---|---|---|---|
| 4,870,579 A | | 9/1989 | Hey |
| 5,583,763 A | | 12/1996 | Atcheson et al. |
| 5,950,172 A | * | 9/1999 | Klingman ..................... 705/26 |
| 5,956,693 A | * | 9/1999 | Geerlings ..................... 705/14 |
| 6,029,141 A | * | 2/2000 | Bezos et al. .................. 705/27 |
| 6,049,777 A | * | 4/2000 | Sheena et al. ................ 705/10 |
| 6,064,980 A | * | 5/2000 | Jacobi et al. ................... 705/1 |
| 6,092,049 A | * | 7/2000 | Chislenko et al. ............ 705/10 |
| 6,102,287 A | * | 8/2000 | Matyas, Jr. .................. 235/380 |
| 6,112,186 A | * | 8/2000 | Bergh et al. .................. 705/10 |
| 6,151,586 A | * | 11/2000 | Brown ......................... 705/14 |
| 6,266,649 B1 | * | 7/2001 | Linden et al. ................ 705/14 |
| 6,321,211 B1 | * | 11/2001 | Dodd ........................... 705/26 |
| 6,484,149 B1 | * | 11/2002 | Jammes et al. ............... 705/26 |
| 6,782,370 B1 | * | 8/2004 | Stack ........................... 705/10 |

FOREIGN PATENT DOCUMENTS

| | | | | |
|---|---|---|---|---|
| EP | 0 751 471 A1 | * | 2/1997 | ........... G06F 17/60 |
| JP | 409265478 A | * | 10/1997 | ........... G06F 17/30 |
| KR | 2001029098 | * | 4/2001 | ........... G06F 17/60 |

OTHER PUBLICATIONS

Hiam, Alexander, "Marketing for Dummies", IDG Books Worldwide, 1997, pp. 98-108.*

"A few well placed Questions", Inc, Sep. 15, 1998 [retrieved on Jun. 26, 2002], vol. 20, Issue 13, 2 pages, Received from: Proquest Direct.*

"NetReflector's www.InstantSurvey.com Goes Live Today", Business Wire, Mar. 23, 1998 [retrieved on Jun. 26, 2002], 3 pages, retrieved from: Proquest Direct.*

"Instant Survey Gets Info from Customers, Fast", Small Business Information, Dec. 21, 1998 [retrieved on Jun. 26, 2002], 2 pages, retrieved from: http://sbinformation.about.com/library/weekly.*

Hof, Robert D., "Technology, Technology, Technology", Business Week, Dec. 14, 1998 [retrieved on Jun. 25, 2002], 2 pages, retrieved from: Proquest Direct.*

Labounty, Char, "Preception Predominates", Service News, Nov. 1998 [retrieved on Jun. 26, 2002], vol. 18, Issue 12, 2 pages, retrieved from: Proquest Direct.*

Sheff, David, "Mr. Satisfaction; J.D. Power Turned the Auto Industry Upside Down by asking a Simple Question", The Los Angeles Times, Oct. 13, 1996 [retrieved on Jul. 8, 2002], 6 pages, retreived from: Proquest Direct.*

(Continued)

Primary Examiner—Tariq R. Hafiz
Assistant Examiner—B. Van Doren
(74) Attorney, Agent, or Firm—Knobbe, Martens, Olson & Bear LLP

(57) ABSTRACT

One embodiment of the present invention is a system and method of encouraging customers to review purchased items. Customers are provided with review requests a predetermined amount of time after the customer has purchased an item or had the item delivered. The predetermined amount of time is related to an estimated time it will take the customer to evaluate the item. The reviews may include textual reviews that are presented to other customers and/or item ratings that are used to generate personal recommendations.

28 Claims, 6 Drawing Sheets

OTHER PUBLICATIONS

Planned Maintenance Program, "What is PMP?", www.followup.com, 04/15/997 [retrieved Jun. 26, 2002], 4 pages, retrieved from: google.com and archive.org.*

Magazzine, Tom, "Re-evaluating business processes", May/Jun. 1998 [retrieved Jul. 11, 2002], vol. 12, Issue 3, 7 pages, retrieved from: Proquest Direct.*

Sheff, David, "Mr. Satisfaction", The Los Angeles Times, Oct. 13, 1996 [retrieved Jul. 25, 2002], 5 pages, retrieved from: Proquest.*

"L.L. Bean, Inc.: Corporate Strategy", Harvard Business School, May 18, 1988, pp. 7, 8, and 17.*

"BizRate Names 'The Buyer's Best' Online Merchants", PR Newswire, Jul. 2, 1998 [retrieved Feb. 20, 2003], 2 pages, retrieved from: Proquest.*

Leong, Kathy Chin, "Customer Service Gets Royal Treatment", Internetweek, Sep. 14, 1998 [retrieved Jun. 26, 2002], 4 pages, retrieved from: Proquest.*

Epinions, screenshots of www.epinions.com, Nov. 29, 1999-Dec. 4, 1999 [retrieved May 17, 2004], 21 pages, retrieved from: google.com and archive.org.*

Net Perceptions, Inc., "Net Perceptions: The GroupLens Solution", www.netperceptions.com, Jan. 18, 1997 [retrieved Feb. 11, 2005], pp. 1-31, retrieved from: Google.com and archive.org.*

Dragan, Richard, et al., "Advice from the Web", PC Magazine, Sep. 09, 1997 [retrieved Jun. 9, 2005], vol. 16, No. 15, pp. 1-9, retrieved from: Dialog, file 275.*

D. Willmott, "Deja View," PC Magazine Online, date May 26, 1996 (2 pages).

M. Rafter, "10 Companies to Watch: Epinions.Com," The Industry Standard Magazine, date Jan. 17, 2000 (3 pages printed from TheStandard.com web site).

D. Willmott, "epinions.com," PC Magazine, dated Sep. 10, 1999 (2 pages printed from zdnet.com web site).

A. Barrett, "What's Your Epinion?", PC World, Sep. 13, 1999 (2 pages printed from PCWORLD.COM Web Site).

C. Kirby, "Everyone's A Critic—Web sites Hope online reviews of products lead to onine buying ," San Francisco Chronicle, Jan. 22, 2000 (3 pages printed from sfgate.com web site).

Martin Roscheisen, Christian Mogensen and Terry Winograd, *Beyond browsing: Shared comments, SOAPs, trails, and on-line communities*, Computer Networks and ISDN Systems 27 (1995) 739-749.

* cited by examiner

FIG. 1

From: Amazon.com
Sent: Monday, January 3, 2000 11:06 AM
To: Joseph Doe
Subject: Write Your Own Review

Write Your Own Review

Hello Joseph Doe.

We'd love for you to *review Tuesdays with Morrie: An Old Man, a Young Man and the Last Great Lesson,* which you purchased on November 6, 1999. You can enter your reviews by clicking on reviews or by copying and using the e-mail form below. Please be sure to focus your comments on the book's content. Read our review guidelines for more information. You can also look at some example customer reviews before you write your own As a thank-you for providing your review so that others may benifit from your opinion, you will be rewarded with a 3% rebate on the book being reviewed. Please remember that the review must meet certain criteria to be eligible for the reward.

REVIEW FORM

We'd love for you to *review Tuesdays with Morrie: An Old Man, a Young Man and the Last Great Lesson,*

Rating:

Review Title:

Review:

Name to be printed on review:

Reviewer's location:

Send my review to:

From: Amazon.com
Sent: Monday, January 3, 2000 11:06 AM
To: Joseph Doe
Subject: Write Your Own Review The book you are reviewing is: *Tuesdays with Morrie: An Old Man, a Young Man and the Last Great Lesson,*

Rating: 5

Review Title: Heartwarming Tale

Review: Outstanding, sensitive telling of the last great and final journey of an extraordinary man.

Name to be printed on review: Joseph Doe

Reviewer's location: Newport Beach, California

Send my review to: Jacob@example.example

FIG. 3

METHODS AND SYSTEM OF OBTAINING CONSUMER REVIEWS

BACKGROUND OF THE INVENTION

1. Field of the Invention

The present invention is related to systems and methods for obtaining information regarding consumer experiences, and more specifically, to methods and systems for obtaining consumer reviews of products or services.

2. Description of the Related Art

The Internet allows consumers to access a wealth of information concerning products or services they are considering purchasing. However, obtaining information from one of the most useful sources of information, that is, other consumers, has proven very difficult. For example, while many Internet commerce sites allow consumers to provide their reviews of a given product or service, few consumers actually do so. Consumers may intend to provide a review once they have used the product or service, but then forget to do so.

Similarly, merchants and manufacturers typically lack sufficient information about consumer experiences with items correspondingly sold by the merchants or made by the manufacturers. Thus, merchants and manufacturers are deprived of information that would allow them to provide better service and/or products. Furthermore, because merchants are deprived of sufficient consumer opinions about previously purchased items, they are inhibited in their ability to generate an accurate consumer profile that would allow the merchants to recommend future items for purchase by the consumer.

Thus, consumers, merchants, and manufacturers are currently deprived from adequately benefiting from the experiences of large numbers of prior consumers. The present invention seeks to encourage consumers to provide reviews and/or ratings, so that other consumers may take these experiences into account when deciding what goods or services to purchase and so that merchants and manufactures can provide consumers with better service and products.

SUMMARY OF THE INVENTION

One embodiment of the present invention seeks to encourage consumers to provide reviews, so that other consumers may take these experiences into account when deciding what goods or services to purchase, or as part of an exchange of ideas and opinions. In addition, the reviews may be used by merchants, distributors, and manufacturers to improve their service and/or products. In accordance with one embodiment of the present invention, a system provides review requests to consumers a predetermined amount of time after they make a purchase of an item or service.

For example, a customer may order an item from an Internet-based merchant using an electronic catalog. If the customer orders a book, a review request will be e-mailed to the customer or presented to the customer on a Web page a predetermined amount of time after the book is purchased or delivered asking the customer for a review of the book. The review request may be for a point rating review and/or a textual review. The predetermined amount of time may be independent of the length of the book or the type of book. Alternatively, the predetermined amount of time may be greater for a relatively longer book or for a non-fiction work, as opposed to fictional work. For items that take a shorter amount of time to evaluate, such as toys, audio disks, and videos, the review request may be sent a correspondingly shorter time, such as a week, after the item was purchased. The review request may be sent or presented specifically on weekends or holidays, when people are more likely to have free time to provide such reviews.

In addition, the review request may be triggered by other events that indicate that the customer has completed reading the ordered book. For example, if the customer orders another book to be delivered to the customer's address, it may be inferred that the customer has completed reading the previous book.

The customer may provide the review either via a reply e-mail or by clicking on or otherwise selecting a link in the review request which will link the customer to a form delivered over the Internet. In one embodiment, the merchant or other review collector can identify and verify that the review comes from an actual purchaser or user of the item being reviewed. This allows the review collector to distinguish reviews coming from a credible source, such as an item purchaser, rather than an anonymous or unverifiable source which may actually be the item manufacturer, author, a competitor or a prankster.

The reviewer identification may be accomplished using a variety of techniques. For example, the link in the review request may be to a unique URL associated with the customer. Thus, the review collector can be substantially certain that a review provided via such a link is an actual customer and a purchaser of the reviewed item. Using another technique, if the customer visits the merchant Web site, the merchant can examine the order history stored in or in association with the customer's cookie using standard cookie techniques, and verify that the customer had actually purchased the reviewed item. If the customer provides the review via an e-mail, the review collector can determine if the review is an actual purchaser of the reviewed item by comparing the reviewer's e-mail address with corresponding customer e-mail addresses stored in a customer database. If a match is found, the customer's order history can be examined to determine if the customer purchased the reviewed item. If the customer had purchased the reviewed item, then the review collector can have a high degree of confidence that the review is a credible review from an actual purchaser and user of the reviewed item.

A reward or incentive may be offered to further encourage the customer to provide a review. The reward may be in the form of a rebate on the reviewed item, a discount coupon toward the purchase of another item, a free gift, free or discounted gift wrapping and/or shipping, and the like. The reward may be conditioned so that it is only available if the customer responds within a certain period of time, or if the review meets certain other conditions.

The reviews, which may include item ratings and/or textual reviews, may be used in a variety of ways. For example, the reviews may be presented to other customers so that they may better evaluate what items to purchase or as part of a forum of ideas. Individual reviews may include a notation, such as an icon or text, indicating that the review comes from a verified purchaser of the reviewed item. This allows other customers to give greater weight to those reviews from actual item purchasers, which are likely to be more credible than completely anonymous or unverified reviews. In one embodiment, only verified reviews will be presented to a customer. Limiting the presentation of to verified reviews may be done in response to a customer command or at the option of the merchant.

Furthermore, the reviews may be synthesized by a merchant into specific recommendations to other customers for items, such as particular books. Reviews provided by a customer may also be used to build a profile for that customer. The customer profile may then be used to recommend other items, such as other books, to that customer based on the customer's previous readings and/or item ratings. For example, a collaborative recommendations algorithm may be used to recommend items to users based on the item rating profiles of such users. For newly released items, the reviews may also be used by the merchant to forecast sales volumes and associated inventory needs.

In addition, the reviews may be used by merchants, distributors and manufactures to improve their service and/or products. For example, if consumers indicate via the reviews that they are particularly unhappy with the lack of certain product features or the overall product performance, manufactures can modify their products to include the desired features or to improve the overall product performance.

BRIEF DESCRIPTION OF THE DRAWINGS

FIG. 1 illustrates a first exemplary e-mail message requesting a customer to provide a review;

FIG. 3 illustrates an exemplary consumer review provided via e-mail;

DETAILED DESCRIPTION OF PREFERRED EMBODIMENTS

Figure 2:
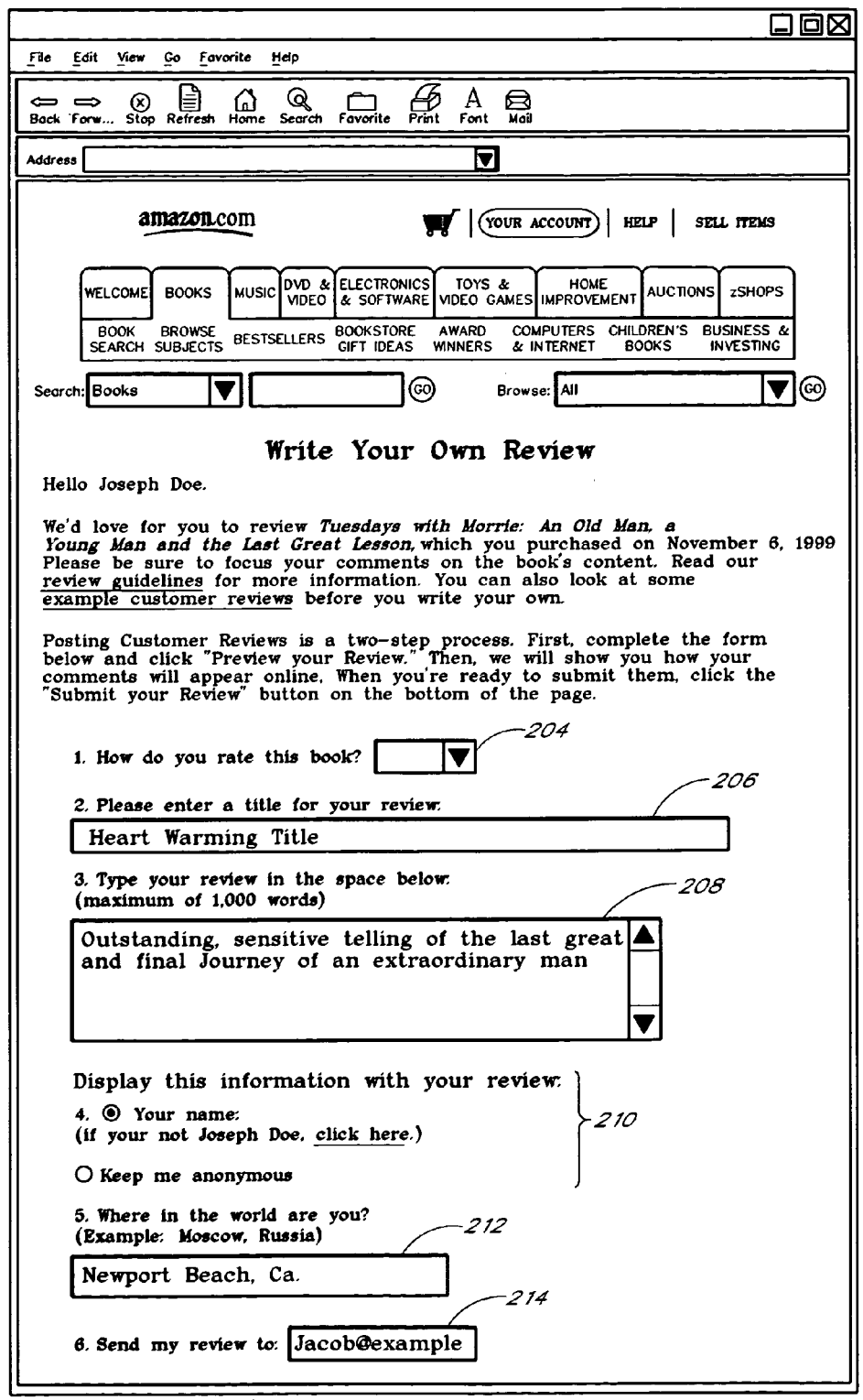
FIG. 2 illustrates an exemplary Web site form page used accept a customer review.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically-distributed computer systems that are appropriately linked together. Furthermore, while the following description relates to an embodiment utilizing the Internet and related protocols, other networks and protocols may be used as well.

The present invention relates to a review collection system that increases the number of reviews collected with respect to goods, services, or the like. The reviews may consist of only a point rating (e.g., one to five stars), or may include textual reviews as well. Reviews may also be collected for Web sites, sellers, magazines, authors, directors, and performers. The sellers for which reviews may be obtained include on-line merchants, "physical" bricks and mortar merchants, as well as third party sellers on a Web site. These third party sellers may be selling items on auction Web sites or on Web sites where third parties can sell items at a fixed price, such as on Amazon's zShops. Thus, using the present invention, consumers, merchants, distributors, and manufacturers are better informed, and a forum for the exchange of ideas is provided. In accordance with one embodiment of the invention, the system advantageously provides customers, purchasers and the like with requests to provide a review for a purchased item or service a predetermined amount of time after the item was purchased or delivered.

For example, a user or customer may order an item, such as a book, from an Internet-based merchant using an electronic catalog presented on the customer computer. Note, that though this example is based on a book purchase, the invention may be used to gather reviews for other types of items, such as electronics, cars, clothing, movies, plays, $3^{rd}$ party sellers, and so on. After a certain period of time, which may be based on an estimated time needed to use and/or evaluate the item, such as to read the book, a reminder, request, or notice may be presented to the customer asking for a review. The review request may be sent via e-mail and/or may be placed on the customer's computer calendar, such as that associated with Microsoft® Outlook or with the Palm® Pilot calendar. In addition, the reminder or request may be presented to the customer when the customer visits certain web sites, such as a web site associated with the merchant which sold the item to the customer. In one embodiment, if the item was designated as a gift by the customer, the review request will not be sent to the customer. Instead, if the gift recipient's e-mail address is available, the review request will be sent to the gift recipient. The review request may also be presented to the recipient when the recipient visits the merchant Web site, assuming the gift recipient is identifiable via a cookie or the like.

The predetermined amount of time after which a review request is sent may be set to be the same for all items within an item type. For example, the predetermined amount of time may be selected to be the same for all books or for all books within a selected set of books. Alternatively, the predetermined amount of time may be selected to be greater for a relatively long book. For example, a review request may be sent one month after a 200 page novel was ordered or delivered. By contrast, for a 650 page novel, the review request may be sent 10 weeks after the novel was ordered or delivered, giving the purchaser more time to read and evaluate the longer book. The predetermined amount of time may also be related to the number of books purchased in a single order or within a given amount of time. For example, if the customer orders 5 books, the predetermined amount of time may be 5 times as long a when the customer orders 1 book.

In addition, the predetermined amount of time may be related to the type of book being ordered. For example, a scientific work typically takes longer to read than a novel. Therefore, a review request or reminder may be sent two months after the order or delivery of a 200 page scientific book, as compared to one month for a comparable length novel. In addition, if there is a holiday or holiday season within a certain amount of time after the purchase is made, the predetermined time may be shortened as people tend to read more during these holidays. These estimated evaluation times may be determined via surveys of consumers, such as readers, to more accurately predict the typical or average amount of time needed to evaluate an item. The estimate evaluation may also be based on information regarding that particular customer, such as the frequency with which the customer has ordered the item type, such as a book, in the past. The survey may include information stored in a merchant database that is used to statistically track how long it typically has taken for customers to provide reviews after purchasing an item.

The review request may be sent to arrive specifically on nights, weekends or holidays, when people are more likely to have free time to provide such reviews. In addition, the review request may be triggered by other events that indicate that the customer has or may have completed reading the ordered book. For example, if the customer orders another book to be delivered to the customer's address, it may be inferred that the customer has completed reading the previous book, and so a review request will be provided to the customer. The inference may be strengthened if the newly ordered book is by the same author as the previously ordered book, falls within the same category as the previously ordered book, and so on. As described above, the review request may be via e-mail or may be provided on the merchant web site after the customer has bought the new book.

In one embodiment, if the customer has previously ordered a new book on the average of once a month and/or previously submitted reviews an average of one month after ordering a book, then a review request may be sent to the customer one month after the purchase or delivery of a new book. The customer may optionally be provided with the capability to specify via a form or the like when or if the review request should be sent to the customer. For example, the customer may specify that a review request should always be sent 9 weeks after a purchase is made. In addition, if several review request messages are scheduled to be sent within a few days of one another, the review requests can be aggregated into a single request, such as a single e-mail.

The customer may provide the review either via an e-mail reply or by activating or clicking on a hyperlink in the review request that links the customer to one or more forms delivered over the Internet. To further encourage customers to provide reviews, a reward or incentive may be offered for consumer generated reviews. The reward may be in the form of a rebate on the reviewed item, a discount coupon toward the purchase of another item, points towards the purchase of another item at a reduced or no cost, a free gift, free or discounted gift wrapping and/or shipping, and the like. The reward may only be provided if the customer responds within a certain period of time. In addition, the review may have to meet certain criteria to be eligible for a reward. For example, the review may have to be greater than a first number of words and/or less than a second number of words. In addition, the inclusion of obscenities or other offensive language may make the review ineligible for a reward.

An important benefit of this process is that it allows merchants, manufacturers, or other collectors to obtain a greater number of product reviews, and in turn, to provide those reviews to other consumers or to those involved in the manufacture or distribution of the products. By then allowing other consumers to read the reviews, consumers are more likely to be attracted to the merchant site, resulting in more sales. In addition, because consumers will be better informed about what is being purchased, they are more likely to be satisfied, thus reducing the number of expensive returns. Furthermore, the reviews may be synthesized by a merchant into specific recommendations for items, such as particular books. Further, based on the consumer reviews, manufacturers can improve their products to better satisfy consumer needs and expectations. For newly released items, the reviews may also be used by the merchant to forecast sales volumes and associated inventory needs.

Of course, in one embodiment reviews may also be collected using conventional techniques. For example, an individual may simply visit the merchant web site, and following the directions provided on the web site, enter a review with or without identifying the reviewer.

Reviews provided by a customer may also be used to build or supplement a profile for that customer. The customer profile may then be used to recommend other items, such as other books, to that customer based on the customer's previous readings and item ratings. For example, a collaborative recommendations algorithm may be used to recommend items to users based on the item rating profiles of such users. Collaborative filtering or recommendation systems operate generally by asking each user to rate items, such as products or services, the user is familiar with, and then storing the user ratings within user-specific rating profiles. To identify the items that may be of interest to a particular user, the user's rating profile is correlated with the profiles of other users to identify users with similar tastes.

For example, in the context of online book sales, suppose that a first user dislikes title 1, is indifferent about title 2, and likes titles 3 and 4; and that a second user dislikes title 1, is indifferent about title 2, likes title 3, and has not yet read title 4. A collaborative filtering system might use this information to predict that the second user will like title 4. When applied over large databases of user ratings data, this type of analysis can produce predictions that are valuable to both users and merchants.

Thus, the items rating profiles may be generated through a combination of the methods described herein and other known methods for prompting users to rate items (see, for example, U.S. application Ser. No. 09/040,171, filed Mar. 17, 1998, which describes aspects of Amazon.com's Book-Matcher service and which is hereby incorporated by reference in its entirety.) The customer profiles may also be used to otherwise personalize web page content.

One embodiment of the incentive system will now be described with reference to FIGS. 1–5. Throughout the following description, reference will be made to various implementation-specific details, including, for example, coding conventions, document and protocol standards, and forms used for requesting and providing reviews. These details are provided in order to fully set forth a preferred embodiment of the invention, and not to limit the scope of the invention. The scope of the invention is set forth in the appended claims.

For purposes of illustration, the merchant Web site in the disclosed implementation is the Web site of Amazon.com. As is well known in the field of Internet commerce, the Amazon.com site includes functionality for allowing users to browse and make online purchases from a catalog of millions of book titles, as well as to purchase toys, games, electronics, music, videos, home improvement items, auction items, and the like. As described below, the site includes a review collection database that stores reviews and information (product codes, order dates, shipping dates, review incentive-types, review incentive periods, etc.) about when reminders or requests should be sent to customers, and optionally, what incentives or rewards will be offered to customers in exchange for reviews. In other embodiments, the items available for purchase from the Web site may, for example, include items available for rent and downloadable items such as software programs and digital publications.

FIG. 1 illustrates a first exemplary e-mail message requesting a customer to provide a review for a purchased item, in this example, a book. The e-mail may be automatically generated and sent to the customer a selected amount of time after the item was purchased. As depicted by FIG. 1, the e-mail specifies for which book the review is being sought. The e-mail also notes the date on which the book was purchased. In addition, the e-mail message optionally specifies one or more rewards for completing a review. Links are provided to review guidelines and to sample reviews. In this example, the user is provided with a review form and/or instructions for providing the review via e-mail, and also provides a link to a URL where a review form is provided. Assuming the customer has access to the Internet, activating the link will cause the customer's browser to present the review form.

If the customer wishes to respond via e-mail, the customer may copy and fill in the attached review form and e-mail it back to the originator or other designated recipient. The form includes the title of the item to be reviewed, and provides fields for entering a numerical rating, such as on a scale of 1–5, a review title, the review itself, the e-mail addresses of those who the review should be sent to, the name, if any, that should be provided with the review, and the reviewer's geographical location. To make the review process easier and quicker for customers, and to further encourage customers to provide reviews, in one embodiment, the customer may only be required to provide the numerical rating review. One or more of the other fields may then be optionally filled out by the customer, or may not be provided to the customer at all.

FIG. 2 illustrates an exemplary Web site form page used accept a customer review. The Web form page may also be automatically generated and presented to the customer in response to activating the corresponding link. The form again specifies for which item the review is being sought. A first field 204 allows the customer to provide a numerical or star rating of the item. A second field 206 allows the customer to provide a title for the review. A third field 208 allows the customer to provide the text of the review. The review may be limited to a certain number of words, such as 1,000 words. A fourth field 210 allows the customer to have their name displayed in association with the review or allows the review to be anonymous. A fifth field 212 allows the customer to specify their geographical location. A sixth field 214 allows the customer to specify that their review should be provided via e-mail to one or more e-mail addresses. These addresses may be associated with people who may be interested in the item or the customer's opinion of the item.

Once the customer has completed the review, the customer may optionally be queried as to whether the customer would like to review other books or items the customer has previously purchased. By activating the associated link, the customer is presented with a list of books or items that the customer has previously purchased, but has not reviewed. The customer may activate or select links corresponding to the items, and in response, is presented with a review form for the item similar to that illustrated in FIG. 2.

FIG. 3 illustrates a review provided via e-mail using the outline provided via the e-mail of FIG. 1. As can be readily seen, the customer can provide the same information or more as that provided using the form illustrated in FIG. 2. For example, the customer can provide a numerical rating, a review title, the review itself, the e-mail addresses of those who the review should be sent to, the name, if any, that should be provided with the review, the reviewer's geographical location, and so on. In one embodiment, the customer does not have to use a form, but instead may use natural language to provide the same type of information. The review may then be parsed by a human or a program to extract and order the information provided.

Figure 4:
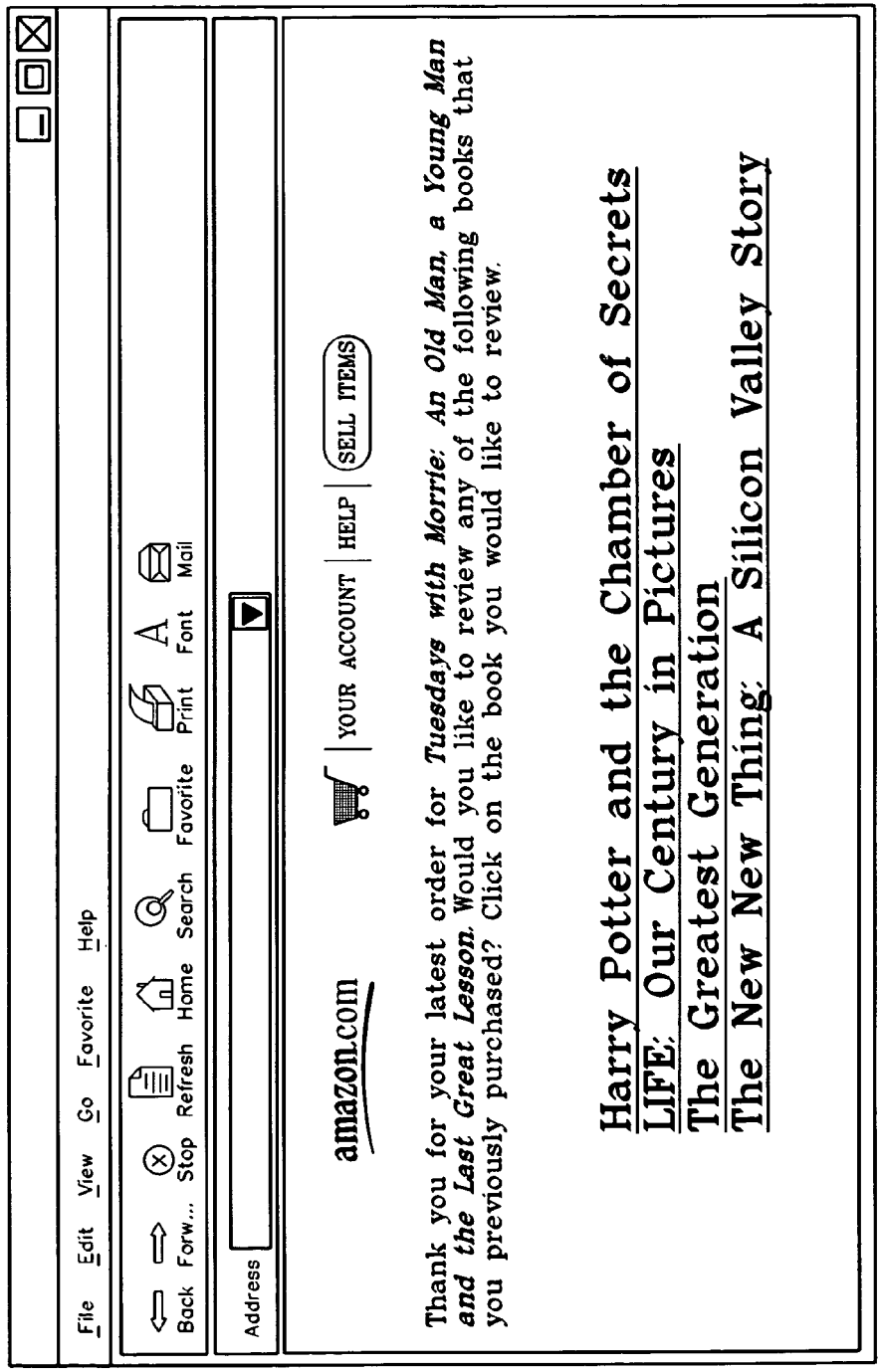
FIG. 4 illustrates an exemplary message presented on a Web site requesting a customer to provide a review of previously purchased items.

FIG. 4 illustrates an exemplary message presented on a Web site requesting a customer to provide a review for previously purchased items after the customer has purchased a new, similar item, such as a new book. As previously discussed, it may be inferred that if a customer is purchasing a new book to be delivered to the customer's address, then the customer has finished evaluating one or more previously purchased books. The customer may click on or otherwise select one or more of the listed previously purchased items and the customer will then be presented with a linked review form, such as that illustrated in FIG. 2.

In one embodiment, the merchant or other review collector can identify and verify that a review comes from an actual purchaser or user of the item being reviewed. This allows the review collector to distinguish reviews coming from a credible source, such as an item purchaser, from those coming from an anonymous or unverifiable source, which may actually be the item manufacturer, author, a competitor or a prankster.

The reviewer identification may be accomplished using a variety of techniques. For example, the link in the review request may be to a unique URL associated with the customer. Thus, the review collector can be substantially certain that a review provided via such a link is an actual customer and a purchaser of the reviewed item. Using another technique, if the customer visits the merchant Web site to enter a review, the merchant can examine the order history stored in or in association with a cookie stored on the customer's computer and verify that the customer had actually purchased the reviewed item. If the customer provides the review via an e-mail, the review collector can determine if the review is an actual purchaser of the reviewed item by comparing the reviewer's e-mail address with corresponding customer e-mail addresses stored in a customer database. If a match is found, the customer's order history can be examined to determine if the customer purchased the reviewed item. If the customer had purchased the reviewed item, then the review collector can have a high degree of confidence that the review is a credible review from an actual purchaser and user of the reviewed item.

When reviews are presented to other customers, individual reviews may include an emphasis or notation, such as an icon or text, indicating that the review comes from a verified purchaser of the reviewed item. This allows other customers to give greater weight to those reviews from actual item purchasers, which are likely to be more credible than completely anonymous or unverified reviews. In one embodiment, only verified reviews will be presented to a customer. Limiting the presentation to verified reviews may be done in response to a customer command, such as via a menu selection or by activating an appropriate link, or at the option of the merchant. In addition, when reviews are presented to customers, the reviews may be prioritized or ranked for presentation based at least in part on whether a given review is from a purchaser. Thus, for example, reviews from verified purchasers may be emphasized by presenting those reviews first or at the top of a listing or reviews. Other reviews, such as those provided by someone merely visiting a merchant review page and anonymously entering a review, may be presented lower on the list of reviews. In one embodiment, reviews from verified purchasers are first presented, and a user can then activate a link to cause reviews from other reviewers to be presented.

Figure 5:
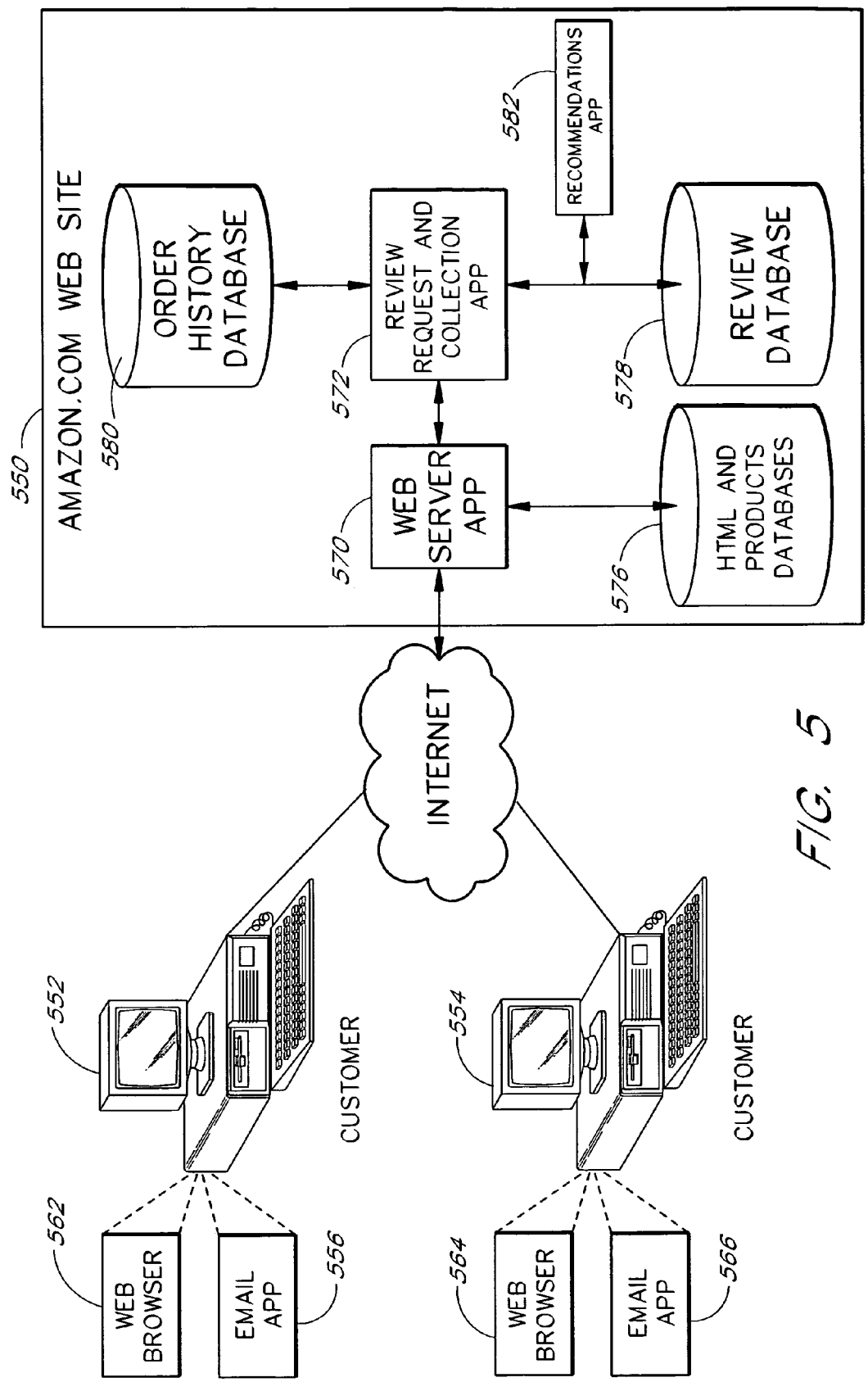
FIG. 5 illustrates an exemplary commerce system, including Web components for implementing a review request system in accordance with one embodiment of the invention and illustrates typical user components for accessing the system.

FIG. 5 illustrates the basic hardware and software components that are typically invoked during the above-described process. As depicted by this drawing, customers access the Web site 550 using respective PCs 552, 554 or other general-purpose computers that have access to the Internet. The customers may alternatively access the Web site 550 using special purpose devices. The customer computers 552, 554 may run commercially-available Web browser applications 562, 564 such as Microsoft Internet Explorer® or Netscape Navigator®, which implement the basic World Wide Web standards such as HTTP and HTML.

The computers 552, 554 may also run a commercially available e-mail application 556, 566, such as Microsoft Outlook® or Netscape Navigator®, which may be used to receive communications from the merchant-related Web site 550. For example, the e-mail application 556, 566 may be used to receive review requests and send reviews, as previously described. The e-mail applications 556, 566 and the browsers 562, 564 may be integrated with one another, and/or may be integrated with other application programs or the operating system.

In the embodiment described herein, the Web site 550 includes a computer system and associated content that are accessible via the Internet. The Web site 550 may optionally include content that spans multiple Internet domains, and/or may be implemented using physical servers that are geographically remote from one another. In other embodiments, the Web site 550 may be in the form of an intranet site, in which case the computers 552, 554 may be coupled to the site solely by a private network. For example, Web site 550 may be in the form of an internal corporate store site for company employees.

In other embodiments, the Web site 550 may be replaced with another type of network site. For example; the various services described herein could alternatively be implemented on a hypertextual site or browsing area of an online services network such as America Online® or MSN®, in which case users may access the site using software that implements non-standard document formats and transfer protocols.

As further depicted by FIG. 5, the Web site 550 includes a commercially-available Web server application 570. The Web server application 570 accesses an HTML and products database 576 that is used to generate Web pages in response to the actions of end users and which keeps track of product information and inventories. Various other back-end components (not shown) are also used for this purpose.

The Web site 550 also includes a review request/collection application 572 which includes the basic functionality for tracking when a review request should be provided to a customer and for offering incentives to customers provide reviews under certain circumstances. The review request/collection application 572 accesses a review database 578 and order history database 580 that store reviews and information (product codes, order dates, shipping dates, review incentive-types, review incentive periods, etc.) about when reminders or requests should be sent to customers, and optionally, what incentives or rewards will be offered to customers in exchange for reviews. In one embodiment, all or part of the customer order history may be stored on the customer's computer system in cookies or the like in addition to or in place of being stored on the Web site 550 memory. The review request/collection application 572 may then access the customer cookie and using the order history stored there determine when reminders or requests should be sent to customers. To save storage space on the customer computer, only more recent orders, such as orders placed in the last 6 months, may be stored on the customer cookie. In addition, as reviews are received from the customer, the reviewed items' order information may be deleted from the customer computer.

The review request/collection application 572 may include an equation. The equation may be based on previous periods between orders and when reviews were received, and/or the number of holidays that have or will occur from the time the item was ordered. Thus, one embodiment of the present invention helps better estimate the time it will take for a purchaser to read a book or otherwise use a purchased item. Thus, the risk is reduced that the review request will be sent before a customer has had a chance to use the item or will be sent long after the customer has used the item.

A recommendation application 582 is also coupled to the review database. The recommendation application is used to generate personalized recommendations for customers based on their reviews as well as on the reviews of others. In one embodiment, the recommendation application utilizes a collaborative filtering algorithm, such as that described above, to generate the recommendations.

Figure 6:
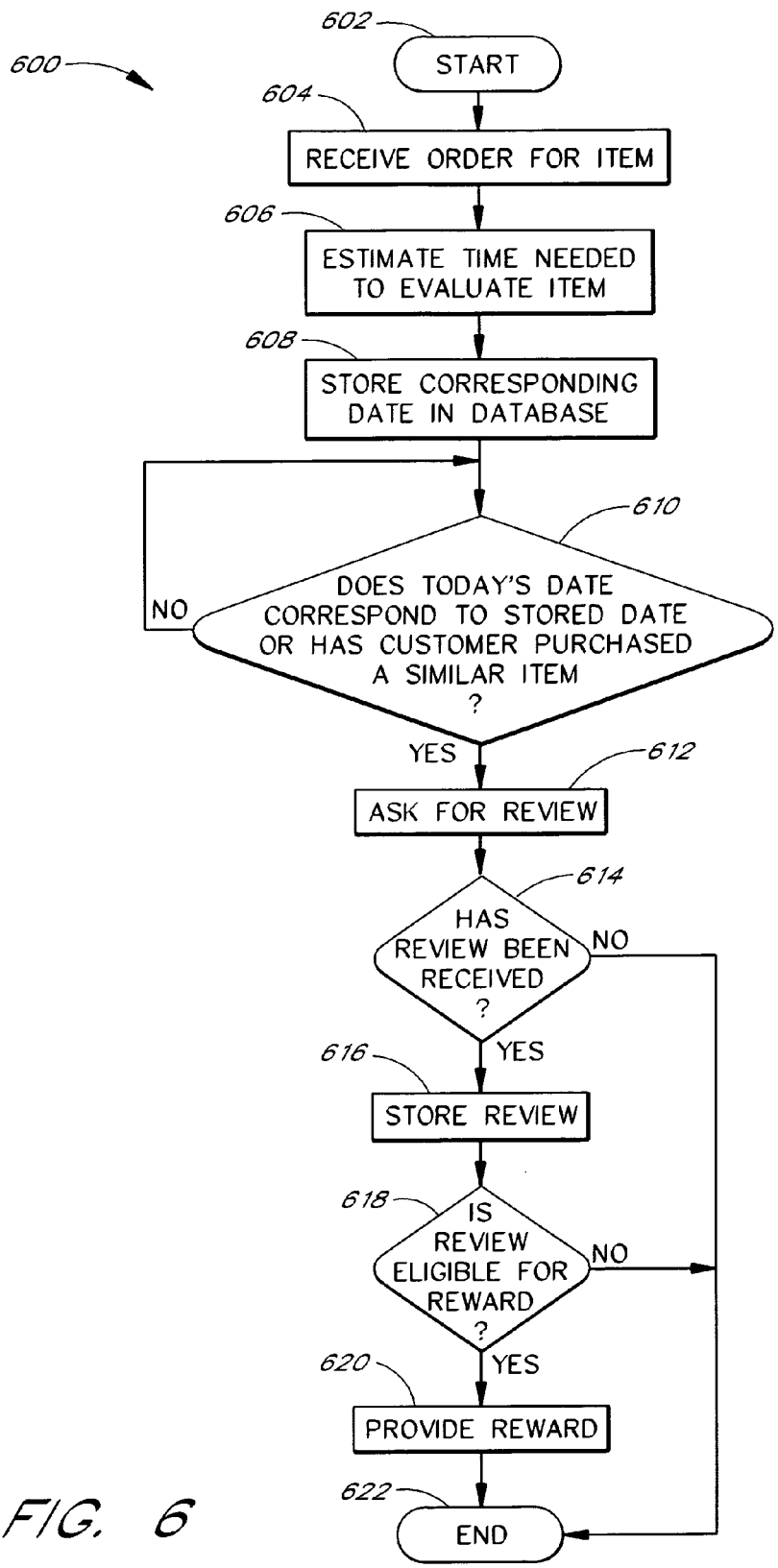
FIG. 6 illustrates an exemplary sequence of acts that are performed by the review request application illustrated in FIG. 5.

FIG. 6 illustrates an exemplary sequence of steps 600 that are performed by the review request/collection application 572 to determine when to request a review. This process 600 executes after the customer has placed an order for an item, such as a book, video, CD, DVD, electronic equipment, car, clothing, and the like. Beginning at state 602, the process 600 proceeds to state 604 where an order for an item is received from a customer. The process 600 dynamically determines or estimates the amount of time that will be needed by the customer to evaluate or at least initially evaluate the item. The customer evaluation may take the form of reading the item if the item is a book, viewing the item if the item is a video, driving the item if the item is a car or other vehicle, and so on. As previously discussed, if the item is a book the estimated time may vary based on the length and/or type of book. If the item is a video or audio recording, a review request may be provided after one week, as videos are often viewed and audio recording are listened to within a week of purchase or rental. Similarly, if the item is a car, the estimated time may be related to the amount of time it will take the purchaser to drive a certain amount of miles, and so more thoroughly evaluate the car. For example, if the average person drives 10,000 miles a year, and a review is desired after the customer has driven and evaluated the car for 3,000 miles, a review request may be provided after 3.6 months. Furthermore, as discussed above, other factors, such as holidays or vacations, may affect the estimate. Of course, other techniques may be used to generate the estimate.

Once the estimate is performed, a corresponding date is stored in the database at state 608. The corresponding date may correspond exactly to the amount of time estimated to evaluate the item, or may instead fall a selected amount of time after or before such a date. For example, in order to increase the number of potential responses to review requests, the request may be provided a predetermined amount of time after the date that corresponds exactly to the amount of time estimated to evaluate the item, to thereby better ensure more customers have sufficient time to evaluate the item.

A determination is made at state 610 as to whether the stored date has arrived and/or whether some other triggering event has occurred, such as the purchase of another similar item. If the stored date has arrived or some other triggering event has occurred, the process 600 proceeds to state 612, and a review request is automatically generated and sent, or otherwise provided, to the customer. By way of example, the requests illustrated in FIGS. 1 and 4 may be used. Of course, as previously discussed, if the item was sent as a gift, the review request may instead be presented to the gift recipient. At state 614, a determination is made as to whether a review has been received from the customer using, for example, the forms illustrated in FIGS. 2 and 3. If a review has been received, the process 600 proceeds to state 616, where the review is stored in the review collection database. Otherwise, the process 614 proceeds to the end state 622.

Proceeding from state 616 to state 618, a determination is made as to whether the review meets certain criteria so as to be eligible for a reward. As discussed above, these criteria may include on or more of the following. The reward may only be provided if the customer responds within a certain period of time. The review may have to be greater than a first number of words and/or less than a second number of words. In addition, the inclusion of obscenities or other offensive language may make the review ineligible for a reward. The reviews of only selected items may be eligible for a reward. If the review is eligible for a reward, the process 600 proceeds to state 620, where the reward is provided. Otherwise, the process proceeds to state 622, where the process 600 ends.

Thus, as discussed above, in one embodiment, the present invention advantageously increases the number of reviews provided by customers by sending out review requests after enough time has elapsed so that it is likely that the customer has evaluated the item. In addition, customers may optionally be offered rewards in exchange for reviews, thereby further increasing the number of customer reviews.

Although this invention has been described in terms of certain preferred embodiments, other embodiments that are apparent to those of ordinary skill in the art are also within the scope of this invention. Accordingly, the scope of the present invention is intended to be defined only by reference to the appended claims.

What is claimed is:

1. A method of encouraging customers to provide reviews of purchased items, the method comprising:
   receiving over a network an order from a first customer for an item purchased from an electronic catalog;
   estimating by what date the first customer will have at least initially evaluated the item based at least on the item type;
   initiating an electronic transmission, based at least in part on the estimated date, to the first customer on or after the estimated date of a message requesting the first customer to provide a review of the item to thereby encourage the first customer to provide at least one review, wherein the message includes a link to an electronic review form and activation of the link by the first customer causes the review form to be presented to the first customer;
   receiving the review from the first customer electronically via the review form;
   individually presenting the first customer review in a group of reviews to a second customer interested in the item; and
   based at least in part on the first customer's review, using a collaborative filtering process to automatically generate personalized recommendations for the first customer of other items.

2. The method as defined in claim 1, wherein the review is a numerical rating.

3. The method of claim 1, wherein the review includes a textual review comprising a plurality of words provided by the first customer.

4. The method of claim 1, wherein the review comprises a textual review, and the method further comprises, in conjunction with presenting the textual review to other customers, indicating that the textual review comes from a purchaser of the reviewed item.

5. The method as defined in claim 1, further comprising offering the first customer a reward in exchange for providing a review, wherein the reward is provided if the review satisfies a first condition.

6. The method as defined in claim 1, wherein the review request is provided via e-mail.

7. The method as defined in claim 1, wherein the group of reviews are ordered based on at least a first reviewer characteristic.

8. The method of claim 1, wherein the first customer review is presented via a Web page to the second customer in association with a name of the first customer.

9. The method as defined in claim 1, wherein the link is a hyperlink to the review form.

10. The method as defined in claim 1, further comprising requesting the first customer to review a seller of the purchased item on or after the estimated date.

11. The method as defined in claim 1, further comprising:
   receiving at least one e-mail address provided by the first customer, the email address being that of a person other than the first customer; and
   forwarding the review to the e-mail address.

12. A method of encouraging customers to provide reviews of purchased items, the method comprising:
   receiving over a network an order from a first customer for an item purchased from an electronic catalog;
   estimating by what date the first customer will have at least initially evaluated the item based at least on the item type;
   initiating an electronic transmission, based at least in part on the estimated date, to the first customer on or after the estimated date of a message requesting the first customer to provide a review of the item to thereby encourage the first customer to provide at least one review, wherein the message includes a link to an electronic review form and activation of the link by the first customer causes the review form to be presented to the first customer;
   receiving the review from the first customer electronically via the review form;
   individually presenting the first customer review in a group of reviews to a second customer interested in the item; and
   automatically generating personalized recommendations for the first customer based, at least in-part, on the review, wherein the personalized recommendations are generated using a collaborative filtering process;
   wherein the item is a book and the estimated date is based at least in part on the length of the book.

13. A method of requesting a review of a purchased item, the method comprising:
   receiving over a network a customer order for an item purchased from an electronic catalog;
   automatically generating an estimate, using information stored in an electronic database, of when the customer has or will have evaluated the item, said estimate based at least in part on (a) a characteristic of the item, and/or (b) a subsequent purchase of another item;
   providing over the network an electronic review request to the customer, said review request being provided to the customer in response to at least the estimate, and being provided at a time spaced apart in time from the order by an amount sufficient for the customer to evaluate the item, wherein the review request requests that the customer provide a review of the purchased item and includes a link to an electronic review form;

receiving the review electronically via the electronic review form; and automatically generating personalized recommendations for the customer using a collaborative filtering process, said personalized recommendations based, at least in-part, on the review;

wherein the item is a video and the act of automatically generating the estimate is related to an estimated time until the customer has viewed the video.

14. The method as defined in claim 13, further comprising verifying that the received review is from a customer that ordered the item.

15. The method as defined in claim 13, wherein the review comprises a textual review including a plurality of words entered by the customer, and the method further comprises presenting the received textual review to other customers in conjunction with an indication that the textual review is from a purchaser of the item.

16. The method as defined in claim 13, where the received review is provided to other customers in association with a name of the customer that provided the review.

17. The method as defined in claim 13, where the received review is used to recommend other items represented in the electronic catalog to the customer.

18. The method as defined in claim 13, where the received review is used to recommend the item to other customers.

19. The method as defined in claim 13, where the estimate is based at least on an estimation of how long the evaluation of the purchased item will take.

20. The method as defined in claim 13 where the review request is selectively delivered on one of a weekend and a holiday.

21. The method as defined in claim 13, where the estimate is based at least in part on the customer ordering a second item.

22. The method as defined in claim 13, further comprising presenting to the customer a list of items purchased by the customer and prompting the customer to review one or more of the listed items.

23. The method as defined in claim 13, further comprising offering the customer a financial reward to be provided after receiving the item review.

24. The method as defined in claim 13, where the item is a gift for a recipient and the review request is provided to the recipient.

25. The method as defined in claim 13, where the review includes a textual review.

26. A method of requesting a review of a purchased item, the method comprising:

receiving over a network a customer order for an item purchased from an electronic catalog;

automatically generating an estimate, using information stored in an electronic database, of when the customer has or will have evaluated the item, said estimate based at least in part on (a) a characteristic of the item, and/or (b) a subsequent purchase of another item;

providing over the network an electronic review request to the customer, said review request being provided to the customer in response to at least the estimate, and being provided at a time spaced apart in time from the order by an amount sufficient for the customer to evaluate the item, wherein the review request requests that the customer provide a review of the purchased item and includes a link to an electronic review form;

receiving the review electronically via the electronic review form; and automatically generating personalized recommendations for the customer using a collaborative filtering process, said personalized recommendations based, at least in-part, on the review;

where the item is a car and the act of automatically generating the estimate is related to an estimated time for the customer to drive a first amount.

27. A method of requesting a review of a purchased item, the method comprising:

receiving over a network a customer order for an item purchased from an electronic catalog;

automatically generating an estimate, using information stored in an electronic database, of when the customer has or will have evaluated the item, said estimate based at least in part on (a) a characteristic of the item, and/or (b) a subsequent purchase of another item;

providing over the network an electronic review request to the customer, said review request being provided to the customer in response to at least the estimate, and being provided at a time spaced apart in time from the order by an amount sufficient for the customer to evaluate the item, wherein the review request requests that the customer provide a review of the purchased item and includes a link to an electronic review form;

receiving the review electronically via the electronic review form; and automatically generating personalized recommendations for the customer using a collaborative filtering process, said personalized recommendations based, at least in-part, on the review;

where the item is an audio recording and the act of automatically generating the estimate is related to an estimated time until the customer has listened to the audio recording.

28. A method of requesting a review of a purchased item, the method comprising:

receiving over a network a customer order for an item purchased from an electronic catalog;

automatically generating an estimate, using information stored in an electronic database, of when the customer has or will have evaluated the item, said estimate based at least in part on (a) a characteristic of the item, and/or (b) a subsequent purchase of another item;

providing over the network an electronic review request to the customer, said review request being provided to the customer in response to at least the estimate, and being provided at a time spaced apart in time from the order by an amount sufficient for the customer to evaluate the item, wherein the review request requests that the customer provide a review of the purchased item and includes a link to an electronic review form;

receiving the review electronically via the electronic review form; and automatically generating personalized recommendations for the customer using a collaborative filtering process, said personalized recommendations based, at least in-part, on the review;

where the item is a book and the act of automatically generating the estimate is related to the type of book.

* * * * *